J. W. FISHER.
Carpet-Stretchers.
No. 151,866.　　　　　　　　　　　　Patented June 9, 1874.
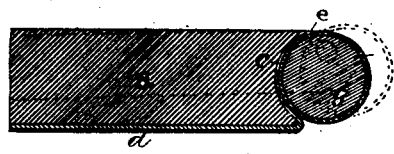
WITNESSES.　　　　　　　　　　　　INVENTOR.

UNITED STATES PATENT OFFICE.

JOSEPH W. FISHER, OF GROTON, NEW YORK.

IMPROVEMENT IN CARPET-STRETCHERS.

Specification forming part of Letters Patent No. 151,866, dated June 9, 1874; application filed March 14, 1874.

*To all whom it may concern:*

Be it known that I, JOSEPH W. FISHER, of Groton, in the county of Tompkins and State of New York, have invented certain new and useful Improvements in Carpet-Stretchers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in carpet-stretchers; and it consists in a suitable block or frame, having a concave edge, and its under surface covered with rubber or other equivalent substance, to which block is pivoted an eccentric roller, covered with rubber, and so arranged in relation to the block that the carpet can be grasped between the roller and block, and stretched to any desired extent.

The accompanying drawing represents my invention.

$a$ represents a suitable block, of any desired size or shape, having a concave edge, $c$, and having its under surface covered with a sheet of rough rubber, $d$, the rubber being made to extend, also, about half-way up the edge $c$. Secured to each end of the block is a small plate of metal, $e$, the front ends of which project beyond the concave edge of the block, and form journals or bearings for the eccentrically-pivoted roller $g$. This roller is about as thick as the block, has its entire surface covered with rubber or other suitable substance, and is so pivoted that it can be made to fit tightly against the concave edge of the block, or be moved outward from it, as shown.

In stretching carpets, its is only necessary to open the roller outward from the block, lay the device loosely on the carpet, and then push forward, when the roller will at once grasp hold of the carpet, and the harder the block is pushed forward, the more firmly does the roller hold the carpet.

Having thus described my invention, I claim—

A carpet-stretcher consisting of the block or frame $a$, having a concave edge, $c$, ears $e$, and roller $g$, the block and roller being covered with rubber, and arranged as specified, to grasp the carpet between them, substantially as shown and described.

In testimony that I claim the foregoing I have hereunto set my hand.

JOSEPH W. FISHER.

Witnesses:
 WILLIAM B. JOHNSON,
 EDWIN M. WELLS.